United States Patent
Henderson et al.

(10) Patent No.: US 8,505,984 B2
(45) Date of Patent: Aug. 13, 2013

(54) CONNECTION ASSEMBLY FOR TUBULAR GOODS

(76) Inventors: Kris Henderson, Lafayette, LA (US); Lee M. Robichaux, Lafayette, LA (US)

(*) Notice: Subject to any disclaimer, the term of this patent is extended or adjusted under 35 U.S.C. 154(b) by 0 days.

(21) Appl. No.: 13/602,165

(22) Filed: Sep. 2, 2012

(65) Prior Publication Data

US 2013/0056977 A1    Mar. 7, 2013

Related U.S. Application Data

(60) Provisional application No. 61/530,743, filed on Sep. 2, 2011.

(51) Int. Cl.
*F16L 17/00* (2006.01)
(52) U.S. Cl.
USPC ............................ 285/376; 285/330; 285/913
(58) Field of Classification Search
USPC ................. 285/376, 314, 315, 330, 390, 392, 285/403, 913
See application file for complete search history.

(56) References Cited

U.S. PATENT DOCUMENTS

| | | | | | |
|---|---|---|---|---|---|
| 1,054,812 | A | * | 3/1913 | Zierath | 403/184 |
| 1,824,257 | A | * | 9/1931 | Bull | 175/325.3 |
| 3,062,568 | A | * | 11/1962 | Andresen et al. | 285/333 |
| 3,104,583 | A | * | 9/1963 | Gasche | 411/411 |
| 3,427,047 | A | * | 2/1969 | Mayo | 285/3 |
| 3,489,055 | A | * | 1/1970 | Erwin | 74/25 |
| 3,727,948 | A | * | 4/1973 | Current | 285/3 |
| 3,966,236 | A | * | 6/1976 | Vann | 285/39 |
| 4,120,520 | A | * | 10/1978 | Ahlstone | 285/18 |
| 5,409,331 | A | * | 4/1995 | Vykukal | 403/109.4 |
| 6,860,525 | B2 | * | 3/2005 | Parks | 285/391 |
| 7,793,994 | B2 | * | 9/2010 | Boyd | 285/354 |

* cited by examiner

Primary Examiner — Aaaron Dunwoody
(74) Attorney, Agent, or Firm — Ted M. Anthony

(57) ABSTRACT

A mating connection assembly of the present invention permits quick and efficient connecting and disconnecting of tubular goods. A female box-end connection member has an inner body defining sockets; ball bearings held within such sockets with an outer sleeve. A male pin-end connection member is inserted within the box end connection. By moving the outer sleeve axially, the ball bearings are urged inward toward the male pin-end connection, creating a frictional locking relationship between the female box-end connection member and male pin-end connection member.

9 Claims, 6 Drawing Sheets

CONNECTION ASSEMBLY FOR TUBULAR GOODS

CROSS REFERENCES TO RELATED APPLICATION

PRIORITY OF U.S. PROVISIONAL PATENT APPLICATION Ser. No. 61/530,743, FILED Sep. 2, 2011, INCORPORATED HEREIN BY REFERENCE, IS HEREBY CLAIMED.

STATEMENTS AS TO THE RIGHTS TO THE INVENTION MADE UNDER FEDERALLY SPONSORED RESEARCH AND DEVELOPMENT

NONE

BACKGROUND OF THE INVENTION

1. Field of the Invention

The present invention pertains to a mating connection assembly for quick and efficiently connecting and disconnecting of tubular goods. More particularly, the present invention pertains to a mating connection assembly that permits the rapid connection and disconnection of tubular goods, equipment and accessories used in well operations. More particularly still, the present invention pertains to a mating connection assembly that provides a fluid pressure seal, supports axial loading and transmits torque.

2. Brief Description of the Prior Art

In many cases, equipment used during the drilling and completion of oil and/or gas wells frequently comprise multiple segments or "subs" that are joined together to form a complete assembly. Such individual segments are typically joined using conventional threaded connections. In order to ensure that such threaded connections form fluid seals that can withstand expected fluid pressures, as well as anticipated axial loading and/or torque forces to be encountered, such connections are typically joined or "made up" at a shop facility or other staging location prior to transportation to a rig or other work site.

Separation of components may be desirable in order to change or replace such components, or to permit access to internal areas of such equipment. However, once on location, it is typically very difficult and time consuming to disconnect and then re-connect the various components of such equipment. Moreover, in many cases, specialized equipment is needed to connect or disconnect the components of such equipment, making such disconnection and re-connection of such components expensive, unsafe, inconvenient and/or otherwise difficult at a well site or other remote location.

Thus, there is a need for a mating connection assembly that permits quick and efficient connection and/or disconnection of components or segments of tubular goods and/or equipment, including while such tubular goods or equipment are present on a rig, or at a well site or other remote location. By way of illustration, but not limitation, such equipment can include casing running tools, cement heads and other surface or down-hole equipment used in connection with the drilling, equipping and/or servicing of oil or gas wells. Such connection assembly should permit quick and efficient connection and disconnection of tubular goods, without the need for specialized equipment (such as, for example, bucking machines) or training, or increased personnel or manpower.

SUMMARY OF THE PRESENT INVENTION

The mating connection assembly of the present invention permits quick and efficient connection and disconnection of tubular goods including, without limitation, components or segments of casing running tools, cement heads and other surface and downhole tools or equipment used in the drilling, equipping or servicing of oil or gas wells. The mating connection assembly of the present invention provides a fluid pressure seal, while supporting axial loading and the transmission of torque. Such components can be easily and efficiently disconnected and re-connected in the field, on a rig, or at a well site or other remote location by existing personnel, without the need for specialized training or equipment.

In the preferred embodiment, the mating connection assembly of the present invention comprises a female or "box-end" connection member. Said box end connection member is generally tubular in shape and has a body section having an upper end, a lower end and a central through-bore extending from said upper end to said lower end. A portion of said body section has a plurality of spaced transverse bores or sockets extending through said body section. Said box end connection member further has a shoulder member extending around the outer circumference of said body member, as well as a section having external threads. In the preferred embodiment, at least one finger lug member extends from the lower end of said body section.

An outer sleeve has a body member, an upper end, a lower end and a central through-bore extending from said upper end to said lower end. Said central through-bore defines an inner surface having at least one groove formed along said inner surface. In the preferred embodiment, said at least one groove is disposed around the circumference of said inner surface and is oriented substantially perpendicular to the longitudinal axis of said central bore. The upper end of said body member defines a tubular extension.

A ring member has a central bore defining an inner surface, with threads disposed along a portion of said inner surface. The tubular extension of said outer sleeve is received within the central bore of said ring member, thereby joining said sleeve and ring member. Said ring member and connected outer sleeve are received on the body section of said box-end connection member; the threads on the inner surface of said ring member mate with the threads on the outer surface of said box end connection member. At least one lug extends radially outward from said ring member to facilitate the application of torque to said ring member. In the preferred embodiment, a sealing assembly (such as, for example, an elastomeric seal) provides a fluid pressure seal between said ring member and outer sleeve.

The connection assembly of the present invention further comprises a pin end connection member. Said pin end connection member is substantially tubular and has an upper end, a lower end and a central through bore extending from said upper end to said lower end. Said pin end connection member further has a shoulder member extending around the outer circumference of said pin end member; said shoulder member defines an upwardly facing surface having at least one lug recess formed in said upper surface. In the preferred embodiment, a plurality of substantially parallel rounded grooves extends around the circumference of said pin end connection member A plurality of rigid balls are disposed in the transverse sockets of said box end connection member, and held in place by said outer sleeve (which, in turn, is connected to said box end connection member via threaded ring member). In a first position, said outer sleeve is axially positioned so that said balls that are disposed in said transverse sockets are aligned with grooves in the inner surface of said outer sleeve member. In this position, said balls do not forcibly extend into the central through bore of said box end connection member.

When joining of the connection assembly of the present invention is desired, the pin end connection member is inserted into the central bore of the box end connection member. In this position, the finger lugs of said box end connection member are received in mating relationship within the lug recesses formed in the upper surface of the shoulder of said pin end connection member.

Said ring member is then rotated, causing mating threads between said ring member and said box end connection member to engage, forcing said ring member (and connected outer sleeve) to move axially relative to said box end connection member. As said outer sleeve moves toward said pin end connection member, said balls are forced inward within said transverse sockets toward said pin end connection member ultimately being received within the rounded grooves on the outer surface of said pin end connection member. In this position, inward force on said balls acts to secure said box and pin end connection members together. The process is reversed in order to disconnect the connection assembly of the present invention.

Any dimensions set forth herein and in the attached drawings are illustrative only and are not intended to be, and should not be construed as, limiting in any way.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed. Further, dimensions, materials and part names are provided for illustration purposes only and not limitation.

FIG. 1a depicts a detailed side sectional view of the highlighted area in FIG. 1.

FIG. 7a depicts a detailed side sectional view of a highlighted area of a female "box end" connection member depicted in FIG. 7.

FIG. 7b depicts a detailed side sectional view of a highlighted area of a male "pin end" connection member depicted in FIG. 7.

DETAILED DESCRIPTION OF A PREFERRED EMBODIMENT OF THE INVENTION

Figure 1:
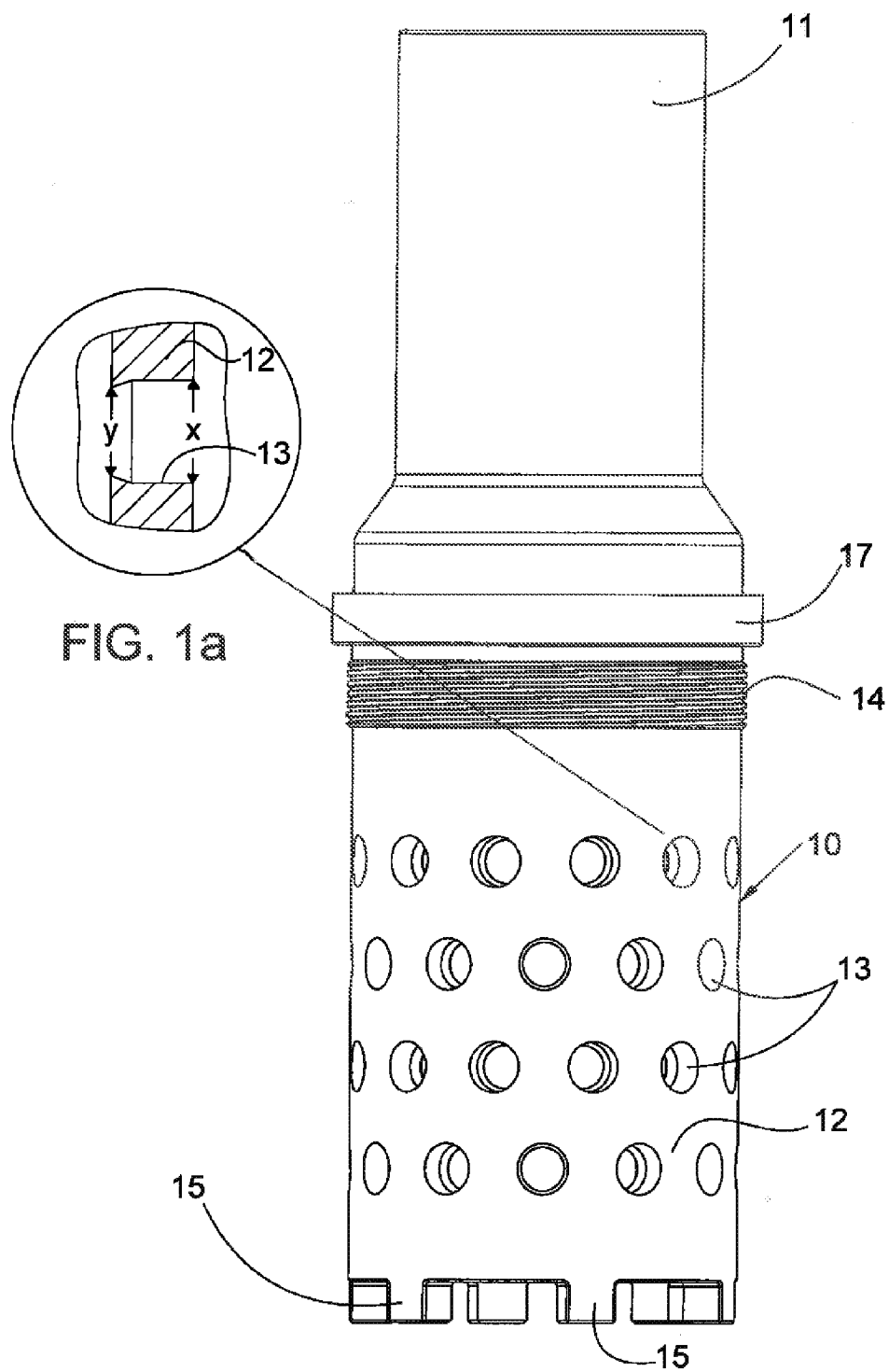
FIG. 1 depicts a side view of a female "box end" connection member of the present invention.

Referring to the drawings, FIG. 1 depicts a side view of a female or "box-end" connection member 10 of the present invention. Said box end connection member 10 comprises generally tubular body member 11 having an upper end, a lower end and a central through-bore extending from said upper end to said lower end. If desired, an optional threaded connection or other connection means can be provided at the upper end of said body member 11 to permit connection with a top drive quill or other equipment.

A portion of said body member 11 defines a tubular perforated member 12 having a central through-bore and a plurality of spaced transverse spherical bores or sockets 13 extending through said perforated member 12. Spherical sockets 13 penetrate through said perforated member 12 and extend to said central through-bore. In the preferred embodiment, said sockets 13 have a larger diameter at the outer surface of said perforated member 12 than at the central bore of said perforated member 12.

FIG. 1a depicts a side sectional view of a detailed area of FIG. 1. Specifically, FIG. 1a depicts a side sectional view of a transverse socket 13 extending through perforated member 12. In the preferred embodiment, the span of the opening of said socket 13 is greater near the outer surface of perforated member 12 (dimension "x") than the span of the opening formed by said socket 13 at the inner surface of perforated member 12 (diversion "y"), nearest central through-bore of box end connection member 10.

Said box end connection member 10 further comprises shoulder member 17 that extends around the outer circumference of said body member 11, as well as external threads 14. In the preferred embodiment, at least one finger lug member 15 extends from the lower end of said body member 11.

Figure 2:
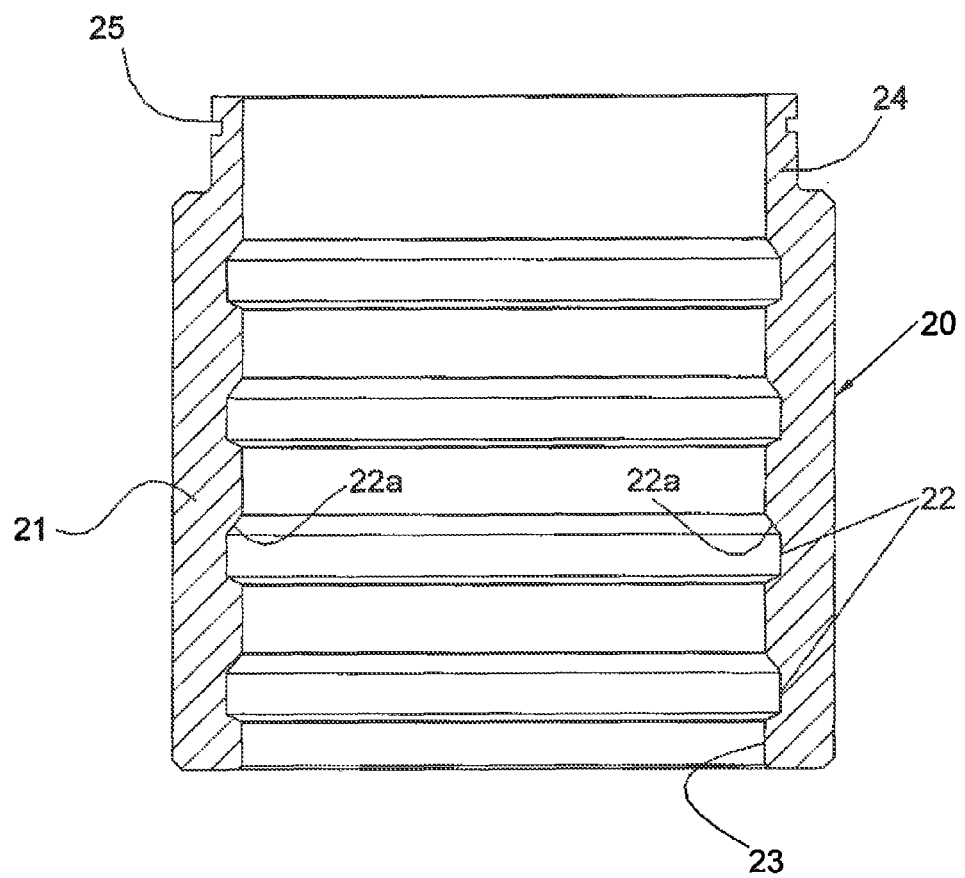
FIG. 2 depicts a side sectional view of an outer sleeve member of a female box end connection member of the present invention.

FIG. 2 depicts a side sectional view of an outer sleeve member 20 of the present invention. Said outer sleeve 20 has a body member 21, an upper end, a lower end. A central bore extends from said upper end to said lower end, and defines an inner surface 23. At least one groove 22 is formed along said inner surface 23. In the preferred embodiment, said at least one groove 22 has tapered edge surfaces 22a and is disposed around the circumference of said inner surface and is oriented substantially perpendicular to the longitudinal axis of sleeve body member 21. Further, the upper end of said body member 21 defines tubular extension 24 having groove 25. In the preferred embodiment, a sealing member, such as an "O-ring" or other elastomeric seal, is disposed in said groove 25.

Figure 3:
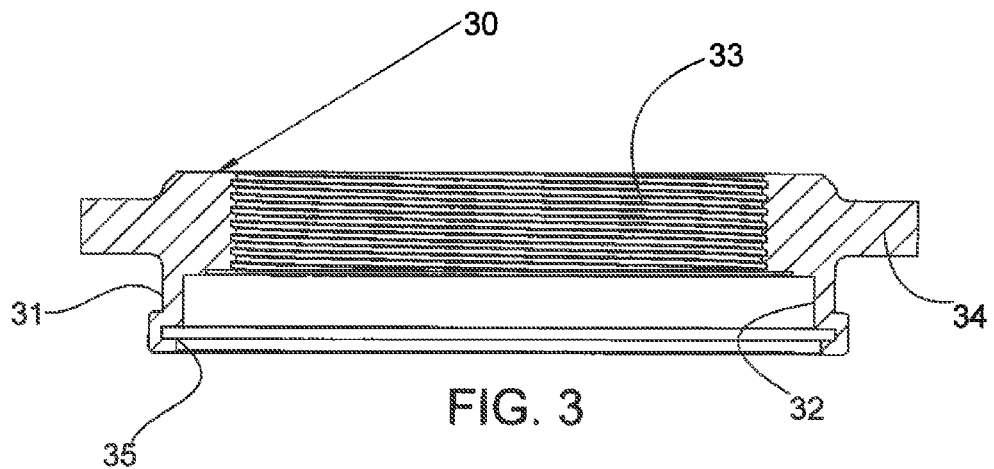
FIG. 3 depicts a side sectional view of a ring member of the present invention.
Figure 4:
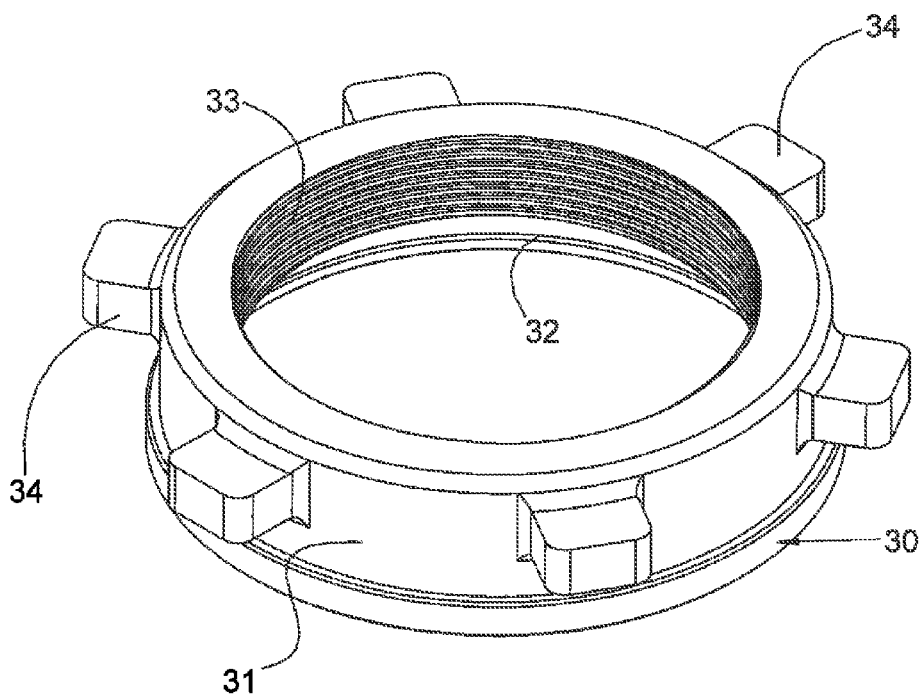
FIG. 4 depicts an overhead perspective view of a ring member of the present invention.

FIG. 3 depicts a side sectional view of a ring member 30 of the present invention, while FIG. 4 depicts an overhead perspective view of said ring member 30. Said ring member 30 has a body section 31 and central bore extending there through, defining an inner surface 32. Threads 33 are disposed along a portion of said inner surface 32. At least one lug 34 extends radially outward from body section 31 of said ring member 30 to facilitate the application of torque to said ring member 30. In the preferred embodiment ring member 30 further comprises internal peripheral groove 35 disposed around inner surface 32 of said ring member 30.

Figures 5, 6:
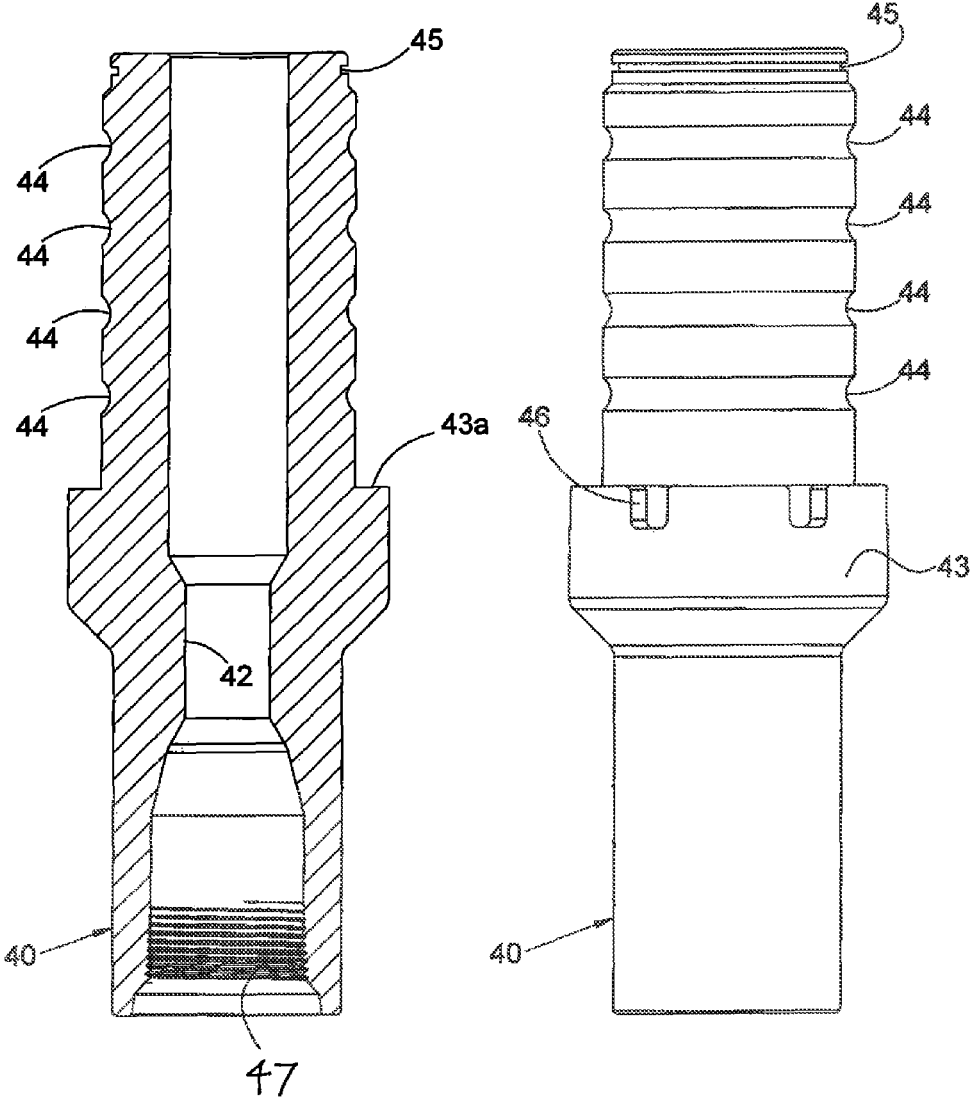
FIG. 5 depicts a side sectional view of a male "pin end" connection member of the present invention.
FIG. 6 depicts a side view of the male "pin end" connection member depicted in FIG. 5.

FIG. 5 depicts a side sectional view of a pin end connection member 40 of present invention, while FIG. 6 depicts a side view of said pin end connection member 40. Said pin end connection member 40 is substantially tubular and has an upper end, a lower end and a central through bore extending from said upper end to said lower end defining an inner surface 42. Said pin end connection member 40 further has a shoulder member 43 extending around the outer circumference of said pin end member; said shoulder member 43 defines an upwardly facing surface 43a having at least one lug recess 46 formed in said upper surface. In the preferred embodiment, rounded grooves 44 extend around the circumference of said pin end connection member and are oriented substantially parallel to each other.

Still referring to FIGS. 5 and 6, groove 45 is formed near the upper surface of said pin end connection member 40, and defines a recess for housing an O-ring or other sealing element. Optional threaded connection 47 can be provided near lower end of pin end connection member 40 for connection to other tubular goods or equipment.

Figure 7:
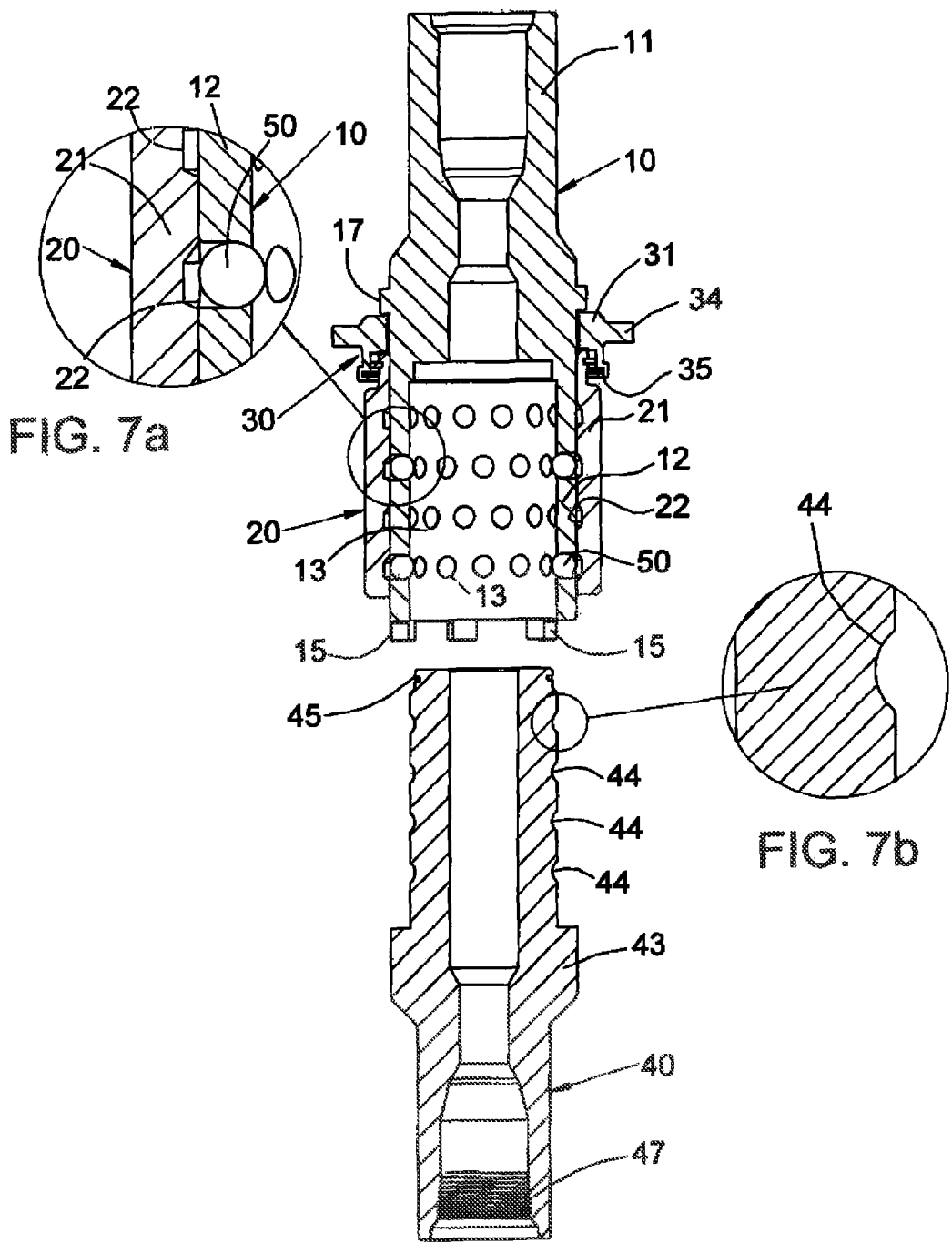
FIG. 7 depicts an exploded side sectional view of the connection assembly of the present invention.

FIG. 7 depicts a side exploded view of the connection assembly of the present invention. In the preferred embodiment, tubular extension 24 of outer sleeve 20 is received within the central bore of said ring member 30 and joined thereto. A sealing assembly (such as, for example, an "O-ring" or other elastomeric seal) is disposed in grove 35 provides a fluid pressure seal between said ring member 30 and outer sleeve 20. Said ring member 30 and connected outer sleeve are received on perforated member 12 of said box-end connection member 10; threads 33 on the inner surface of said ring member 30 mate with the threads 14 on the outer surface of said box end connection member 10.

Rigid balls 50 are disposed within the transverse sockets 13 of said box end connection member 10. The opening of said sockets 13 is smaller than the diameter of balls 50 where said sockets 13 open into the central bore of perforated member 12 (dimension "y" on FIG. 1a); as such, said balls 50 are capable of partially protruding from sockets 13 into said central bore of perforated member 12, but cannot pass fully through said sockets 13 into said central bore of perforated member 12. Said balls 50 are held within said sockets 13 by said outer sleeve 20 (which, in turn, is connected to said box end connection member 10 via threaded ring member).

In the position depicted in FIG. 7 and FIG. 7a, said outer sleeve 20 is axially positioned relative to box end connection member 10 so that said balls 50 disposed in said transverse sockets 13 are aligned with inner grooves 22 of said sleeve member 20. In this position, said balls 50 are not urged inward and do not forcibly protrude into the central through-bore of perforated member 12 of box end connection member 10.

Figure 8:
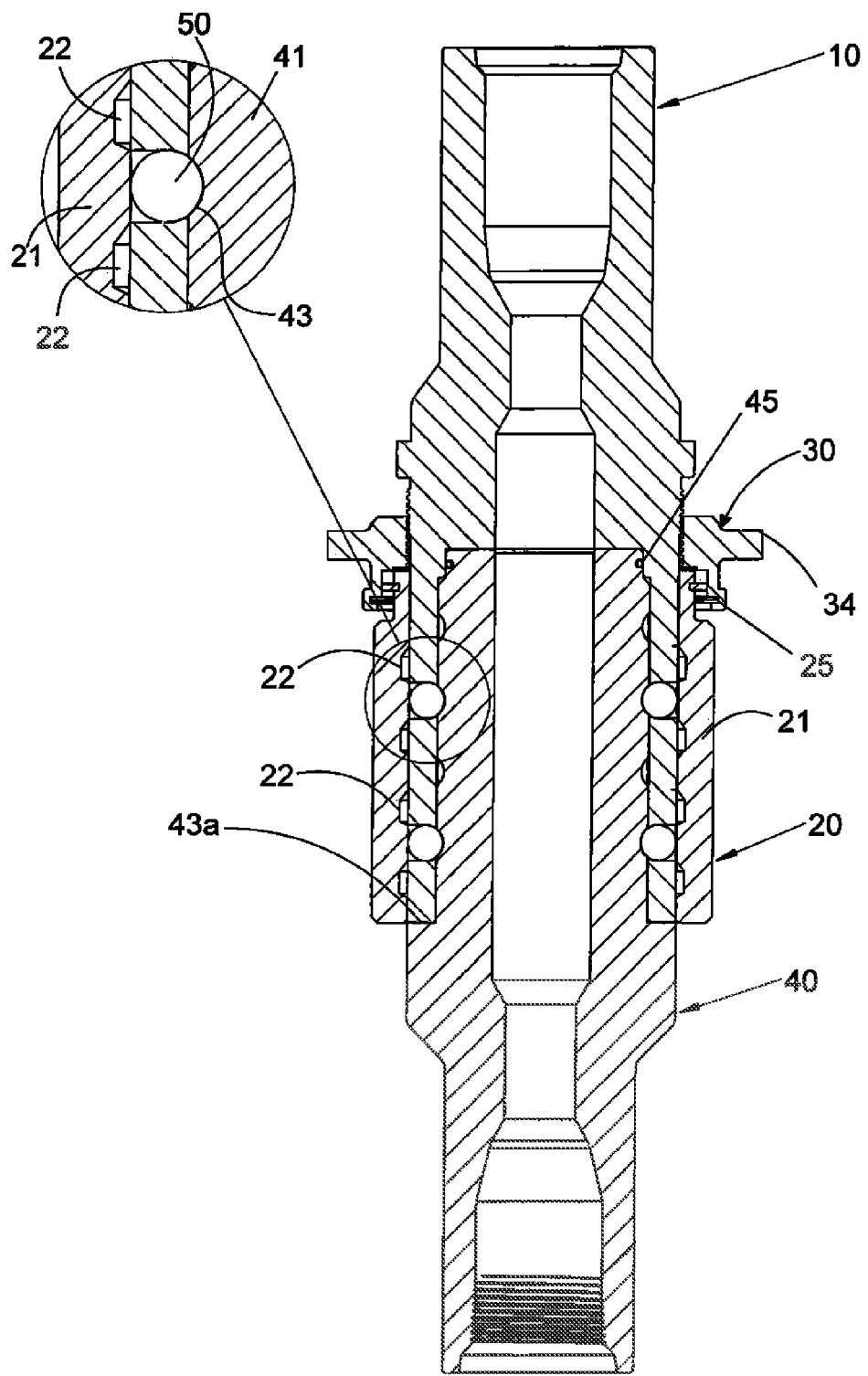
FIG. 8 depicts a side sectional view of a mating connection assembly of the present invention.

Referring to FIG. 8, when joining of the connection assembly of the present invention is desired, pin end connection member 40 is inserted into perforated member 12 of box end connection member 10. In this position, finger lugs 15 at the bottom end of said box end connection member 10 are received in mating relationship within the lug recesses 46 formed in the upper surface of shoulder 43 of said pin end connection member 40. Said ring member 30 is then rotated—that is screwed down—causing mating threads between said ring member 30 and said box end connection member to engage, thereby forcing said ring member 30 (and attached connected outer sleeve 20) to move axially relative to said box end connection member 10.

As said outer sleeve 20 moves toward said pin end connection member 40, balls 50, aided by tapered edge surfaces 22a, move out of grooves 22 of sleeve 20. As said sleeve 20 moves axially, said balls 50 are forced inward by sleeve 20 (or, more particularly, the portions of inner surface 23 of sleeve 20 between grooves 22) and urged toward said pin end connection member 40. Said balls 50 are ultimately received within rounded grooves 44 on the outer surface of said pin end connection member 40. In this position, inward force on said balls 50 acts on pin end connection member 40 to secure said box end connection member 10 and pin end connection member 40 together. In the preferred embodiment, rounded grooves 44 have substantially the same radius of curvature as balls 50.

An optional threaded connection 47 can be provided on lower end of pin end connection member 40 to permit said pin end connection member 40 to be connected to a tool or other equipment that is to be used. Near the upper end of pin end connection member 40 is circumferential groove 45 that holds a seal member (such as an "O-ring" or other elastomeric seal) used to provide a fluid pressure seal between pin end connection member 40 and box end connection member 10. Said fluid pressure seal from high internal pressures generated from drilling mud, cement or other fluid flowing through said connection assembly.

When detachment of the connection assembly of the present invention is desired, ring member 30 is rotated, thereby engaging the threads between said ring member 30 and said box end connection member 10 and causing said ring member 30 (and attached connected outer sleeve 20) to move axially relative to said box end connection member 10. When this occurs, grooves 22 of sleeve 20 become aligned with balls 50. As a result, inward force applied to said balls 50 by said sleeve is relieved, permitting said balls 50 to move out of rounded grooves 44 of pin end connection member 40. With such inward force on balls 50 removed, said pin end connection member 40 can be removed from box end connection member 10, permitting the connection assembly of the present invention to be separated.

The mating connection assembly of the present invention permits quick and efficient connecting and disconnecting of tubular goods including, without limitation, components or segments of casing running tools, cement heads and the like. Such components can be easily and efficiently disconnected and re-connected in the field, on a rig, or at a well site or other remote location by existing personnel, without the need for specialized training or equipment.

The mating connection assembly of the present invention provides a fluid pressure sealed connection, thereby permitting fluids (such as, for example, drilling mud, cement or completion fluids) to be pumped or circulated at elevated pressures through said assembly. Further, finger lug members 15 of box end connection member 10 received within lug recesses 46 formed in the upper surface of shoulder 43 of said pin end connection member 40 facilitate the transmission of torque, thereby permitting rotation of the connection assembly of the present invention. The connection assembly of the present invention also supports axial loading, such as when weight from a pipe string or other source is present below the connection member, or when a pipe string containing the connection assembly of the present invention is reciprocated.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:
1. A connection assembly comprising:
   a) a box end connection member comprising:
      i) a substantially tubular body having an upper end, a lower end, an outer surface, a central through bore extending from said upper end to said lower end, and a plurality of transverse sockets extending through said body member from said outer surface to said central bore;
      ii) at least one lug finger disposed at said lower end of said body;

b) at least one ball received within said at least one transverse socket;
c) a sleeve slidably disposed over said body of said box end connection member, said sleeve having an upper end, a lower end, an inner surface and a plurality of spaced circumferential grooves around said inner surface; and
d) a pin end connection member, adapted to be partially received within said box end connection member, comprising:
  i) a substantially tubular body having an upper end, a lower end, an outer surface and a central through bore extending from said upper end to said lower end, and a plurality of circumferential grooves disposed around said body;
  ii) a shoulder member extending radially outward from said body, having at least one lug recess adapted to receive a lug finger of said box end connection member.

2. The connection assembly of claim 1, further comprising:
a) threads around the outer surface of the body of said box end connection member;
b) a ring member, attached to said sleeve, having an outer surface, an inner surface, and threads disposed on said inner surface, wherein said threads on said inner surface of said rings are matingly engaged with said threads on said outer surface of said body of said box end connection member.

3. The connection assembly of claim 1, further comprising a seal assembly disposed between the outer surface of said pin end connection member and the inner surface of said box end connection member.

4. The connection assembly of claim 3, wherein said seal assembly comprises an elastomeric seal disposed around said outer surface of said pin end connection member.

5. The connection assembly of claim 1, wherein the openings formed by said sockets at said central bore of said box end connection member are smaller than the diameter of said balls.

6. The connection assembly of claim 1, wherein said circumferential grooves disposed around said body of said pin end connection member are rounded.

7. The connection assembly of claim 6, wherein said rounded circumferential grooves have substantially the same radius of curvature as said balls.

8. The connection assembly of claim 1, wherein said spaced circumferential grooves of said sleeve have tapered edges.

9. The connection assembly of claim 2, wherein said ring member further comprises at least one lug extending radially outward from said ring member.

* * * * *